United States Patent [19]

Shirogami et al.

[11] Patent Number: 4,515,871
[45] Date of Patent: May 7, 1985

[54] ELECTROCHEMICAL POWER GENERATOR

[75] Inventors: Tamotsu Shirogami, Yamato; Mitsushi Ueno, Yokohama, both of Japan

[73] Assignee: Tokyo Shibaura Denki Kabushiki Kaisha, Kawasaki, Japan

[21] Appl. No.: 523,598

[22] Filed: Aug. 16, 1983

[30] Foreign Application Priority Data

Aug. 31, 1982 [JP] Japan .................. 57-149985

[51] Int. Cl.³ ............................... H01M 2/00
[52] U.S. Cl. .......................... 429/34; 429/40; 429/42
[58] Field of Search ............. 429/34, 38, 39, 35, 429/36, 37, 40, 42

[56] References Cited

U.S. PATENT DOCUMENTS

| | | | |
|---|---|---|---|
| 4,165,349 | 8/1979 | Sandelli | 264/29.1 |
| 4,407,904 | 10/1983 | Uozumi et al. | 429/39 |
| 4,450,212 | 5/1984 | Feigenbaum et al. | 429/36 |

Primary Examiner—Charles F. LeFevour
Attorney, Agent, or Firm—Oblon, Fisher, Spivak, McClelland & Maier

[57] ABSTRACT

An electrochemical power generator is disclosed which is composed of a plurality of unit cells stacked with interconnectors interposed therebetween; said unit cells being each composed of an anode consisting of a porous carbon plate having on its one surface a plurality of grooves constituting gas passages and on its other surface an anode catalyst layer; a cathode formed on its one surface with a cathode catalyst layer and applied on its other surface a hydrophobic material powder consisting of fluoropolymer resin; and an electrolyte layer interposed between the anode and the cathode in such a manner that its two surfaces are allowed to come into contact, respectively; said anode catalyst layer and said cathode catalyst layer, the electrolyte layer being prepared by causing an acidic electrolyte to be impregnated into an inorganic compound powder having heat resistance and chemical resistance; the interconnectors being each compressed of a high density carbon plate and having, on each surface coming into contact with the cathode, a plurality of grooves for gas passages, being used as an anode-active material, of a gas consisting mainly of hydrogen and, as a cathode-active material, of an oxidizing gas. First ribs and second ribs wider than said first ribs are formed between adjacent ones of the grooves of the anode substrate, and a catalyst is dispersed in the cathode substrate over a range extending from a boundary between a surface of contact of the cathode substrate with the cathode catalyst layer up to a point located inside the cathode substrate.

10 Claims, 6 Drawing Figures

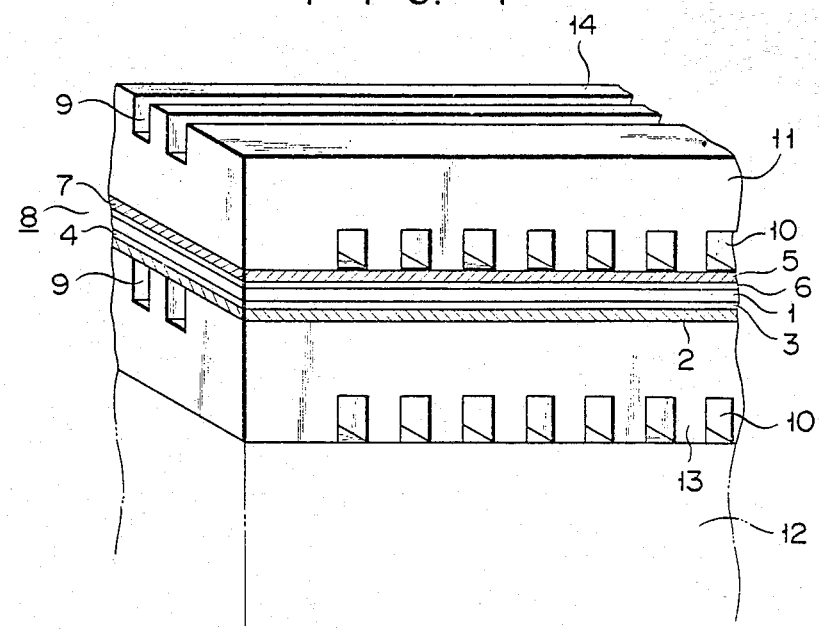
F I G. 1
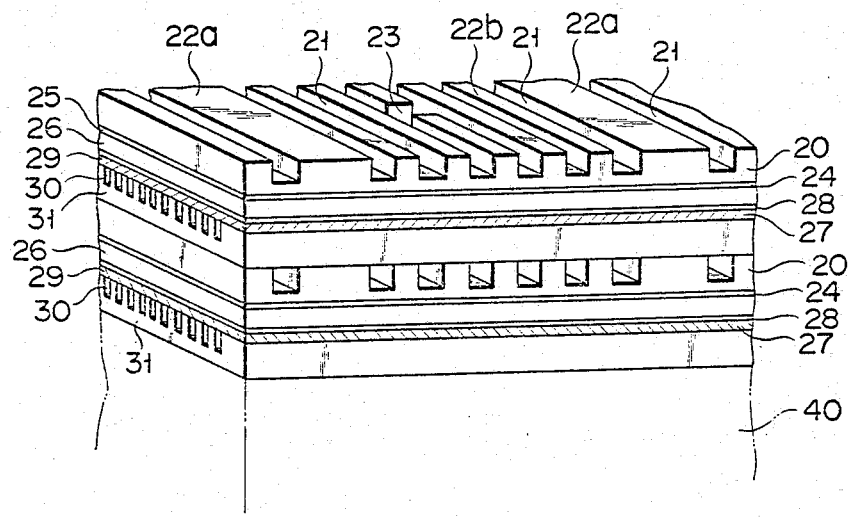
F I G. 2

000
ELECTROCHEMICAL POWER GENERATOR

BACKGROUND OF THE INVENTION

The present invention relates to an electrochemical power generator which generates power by using a gas consisting mainly of hydrogen as an anode-active material, a gas such as oxygen having oxidizing power as a cathode-active material, and an acidic solution as an electrolyte.

An electrochemical power generator is known which causes the generation, as DC power, of Gibb's free energy developed in an electrochemical reaction between a gas, such as hydrogen, which is capable of being easily oxidized, and an oxidizing gas, such as oxygen. It is well known to those in the art that this type of power generator is high in generating efficiency, causes very little noise, and produces less undesirable discharge. For obvious reasons, such a power generator has recently attracted a great deal of attention as a suitable power generator for power plants to be built in densely populated regions.

A power generator prepared by stacking a large number of unit cells 8, as shown in FIG. 1, is conventionally known as the above-mentioned power generator. In FIG. 1, the unit cell 8 is made up of: a cathode 4 consisting of a porous carbon thin plate made of graphite fiber and having a cathode catalyst layer 3 provided on its one side, an anode 7 having an anode catalyst layer 6 provided on its one side, and an electrolyte layer 1 interposed between the cathode and anode catalyst layers 3, 6, with said cathode and anode and electrolyte layers being adhered to each other for integration. The electrolyte layer 1 is formed of a material which is high in heat resistance, chemical resistance and oxidation resistance, and is impregnated with an electrolyte solution such as concentrated sulfuric acid solution, concentrated phosphoric acid solution or the like. Platinum or the like is used as a catalyst contained in the catalyst layers. The cathode 4 and the anode 7 are subjected to a waterproofing treatment based on the use of polytetrafluoroethylene or the like.

Since an electromotive force produced in the unit cell 8 having said construction has a value of around 1 V at the most, unit cell arrays as large as several tens or several hundreds of unit cells are required to be stacked and connected to each other in series in order to realize a practical power generator. In the prior art, when the unit cells are stacked, an interconnector 11 consisting of a conductive carbon plate, or a molded graphite plate of high density, is interposed between each unit cell 8 for electrical connection between each unit cell 8. On one surface of the interconnector 11, namely that surface which comes into contact with cathode 2, there are formed in parallel a large number of grooves 9 for permitting the flow therethrough of an oxidizing gas; and on the other surface of the interconnector 11, namely the surface thereof which comes into contact with anode 5, there are formed a large number of grooves 10 for permitting the flow of a gas containing hydrogen gas, in such a manner that the grooves 10 extend in parallel in a direction perpendicular to the direction in which the grooves 9 extend. It is to be noted here that a large number of the interconnectors 11 are disposed such that the direction in which the grooves 9 or 10 extend is made the same with respect to each interconnector 11. Further, the grooves 9, 10 are provided in large number and with narrow ribs 14, 13 between the grooves for the purpose of distributing a gas as an active material uniformly and with high efficiency onto the entire corresponding surface of the cathode and anode and at the same time removing the reaction products with high efficiency.

In the electrochemical power generator constructed as mentioned above, a sufficient feeding of the reacting gases onto the surfaces of the cathode and anode as well as a speedy removal of the reaction products is necessary to maintain the high performance of the power generator for a long period of time. Further, ensuring high electrochemical reactivity as well as maintaining the internal ohmic loss of the unit cells at a low level is important for maintaining high generating efficiency of the power generator. Further, when a large number of the unit cells are stacked with the interconnectors interposed therebetween, the unit cells and the interconnector must be fastened together uniformly and with high mechanical strength to ensure uniform surface-contact between the unit cell and the interconnector.

Since, however, the prior art power generator shown in FIG. 1 is constructed such that the cathode, anode and interconnector are made thin so as to maintain a small internal ohmic loss in the cells, there arises a problem that the amount of electrolyte solution held in the cell is not sufficient, resulting in a drawback that the resultant power generator cannot perform long-term operation. Further, in the above-mentioned prior art power generator, the cathode and anode are substantially the same in construction. That is, the fact that a difference exists between the cathode and the anode with respect to the gas diffusion and the reaction rate is not taken into consideration. Accordingly, the construction of the prior art power generator fails to obtain a high electrochemical reactivity with high reliability. Further, the prior art power generator has a drawback in that it is impossible to ensure sufficient surface-contact between the unit cell and the interconnector, thus failing to obtain a uniform current distribution. Further, the unit cell and the interconnector are difficult to fasten with uniform mechanical force, possibly leading to damage to the anode and cathode which are quite thin.

SUMMARY OF THE INVENTION

The object of the present invention is to provide an electrochemical power generator which is capable of being stably operated with high generating efficiency over a long time.

The electrochemical power generator, according to the invention, has a structure wherein: a plurality of unit cells are stacked with interconnectors interposed therebetween; said unit cells being each constituted by an anode consisting of a porous carbon plate and formed on its one surface with a plurality of grooves constituting gas passages and formed on its other surface with an anode catalyst layer; a cathode formed on its one surface with a cathode catalyst layer and dispersed on its other surface with hydrophobic material consisting of fluoropolymer resin; and an electrolyte layer prepared by impregnating an acidic electrolyte into an inorganic compound powder having heat resistance and chemical resistance and interposed between said anode and said cathode in such a manner that said electrolyte layer is allowed to contact the anode catalyst layer and cathode catalyst layer on both its surfaces, respectively; said interconnector consisting of a high density carbon plate and formed with a plurality of grooves serving as the gas passages on its one surface which comes into contact with said cathode and its other surface which comes into contact with said anode which make it smooth. In the electrochemical power generator so constructed, a gas consisting mainly of hydrogen is used as an anode-active material and a gas having oxidizing power is used as a cathode-active material. Between two adjacent grooves formed in the anode substrate, there is a first rib or a second rib having a width greater than the first rib. A catalyst is dispersed into the interior of the cathode substrate from the surface thereof which comes into contact with the cathode catalyst layer.

According to the electrochemical power generator of the invention, the anode and cathode are constructed in accordance with the property of the gas allowed to flow therethrough, particularly with the reaction rate thereof, with the result that an effective utilization of the gas is possible. Further, according to the present electrochemical power generator, a large amount of electrolyte solution is retained in the wide ribs formed on the anode. Furthermore, the amount of electrolyte solution entrained by the gas from the unit volume of the wide ribs is smaller than that of the solution entrained by the gas from the same unit volume of the narrow ribs. Thus, the volume of the electrolyte solution in the electrolyte layer can be maintained over a long period of time, with the result that the internal resistance and terminal potential do not vary over a long period of time, thereby making long-term power generation possible.

In this way, a stable and long-term operation of high generating efficiency is possible with the electrochemical power generator of the invention, thus making it possible to realize a more practical power plant.

BRIEF DESCRIPTION OF THE DRAWINGS

FIG. 1 is a perspective view showing a main part of a prior art electrochemical power generator;

FIG. 2 is a perspective view showing a main part of the electrochemical power generator according to an embodiment of the invention;

DETAILED DESCRIPTION OF THE PREFERRED EMBODIMENTS

Figure 3:
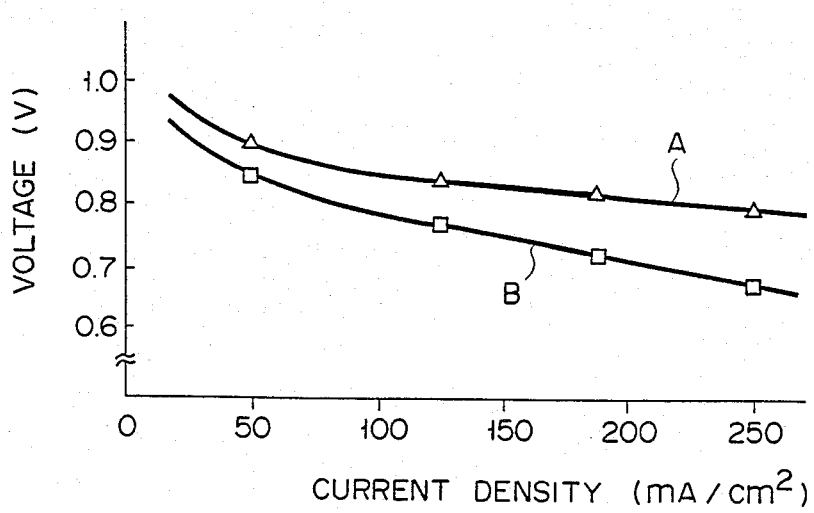
FIG. 3 graphically shows the voltage-current density characteristics of the cathode of the power generator of the invention and of the cathode of the prior art power generator.

Since air used as the oxidizing gas is very low in electrode reaction rate and hydrogen is a very easily diffusible gas, the invention is characterized in that a cathode having a catalyst diffused thereinto is used and an anode provided on its one surface with wide ribs is used, so that the electrolyte solution may be retained in large volume.

One embodiment of the invention will now be described with reference to the accompanying drawings.

FIG. 2 is a perspective view of a unit cell constituting an electrochemical power generator embodying the invention. In FIG. 2, the reference numeral 20 denotes an anode substrate. The anode substrate 20 consists of a porous carbon plate having a bulk density of 0.28 to 0.78 and a thickness of 2 to 4 mm, such as, a felt-like carbon fiber plate, carbon fiber sheet plate, or a sintered porous plate consisting mainly of carbon fiber. The anode substrate 20 is formed on its one surface with a plurality of grooves 21 which are 1.2 to 2.5 mm wide and 1.5 to 2.5 mm deep which is intended to permit the flow thereinto of a gas consisting mainly of hydrogen gas and serving as an anode-active material. The ribs produced between the adjacent grooves 21 include wide ribs 22a and narrow ribs 22b. The wide ribs 22a have a width of 4 to 7.5 mm while the narrow ribs 22b have a width of 1.5 to 2.5 mm. The ribs 22a are formed at the rate of one rib for each five to ten ribs 22b. Note here that the ribs 22a and 22b delete may be provided, at suitable positions, with a connecting groove 23 which connects the grooves 21 to each other for the purpose of making the flow of the gas over the entire surface of the anode substrate 20 uniform. The anode substrate 20 is formed on its other surface with an anode catalyst layer 24 containing a catalyst such as platinum, to promote the anode reaction. An anode 25 is comprised of the anode substrate 20 and the anode catalyst layer 24. A hydrophobic material powder consisting of fluoropolymer resin such as, polytetrafluoroethylene is dispersed in the bottom and side surfaces of the groove 21 of the anode substrate 20. This fine fluoropolymer resin powder permits the entry thereinto of the gas and, on the other hand, acts to prevent the seepage of the electrolyte solution.

A cathode 29 is comprised of a cathode substrate 27 and a cathode catalyst layer 28 provided on one surface of the cathode substrate 27. The cathode substrate 27 has a porous carbon plate, such as a porous graphite fiber sheet, having a thickness of 0.3 to 0.4 mm and a porosity of 70 to 80%. The cathode catalyst layer 28 contains a catalyst such as, platinum to promote the cathode reaction. This catalyst is not only dispersed within the cathode catalyst layer 28 but also into the cathode substrate 27. The catalyst in the cathode substrate 27, is preferably distributed from the boundary between the cathode substrate 27 and the cathode catalyst layer 28 up to an internal position of the cathode substrate 27 located therein to a depth of at least 30% of the thickness thereof. The cathode substrate 27 is coated on its other surface with a fine powder consisting of, for example, fluoropolymer resin. When the cathode substrate 27 becomes wet with the electrolyte solution, the degree to which the oxidizing gas is diffused into the cathode substrate 27 decreases. Said coating of said fine powder onto the other surface of the cathode substrate 27 is intended to prevent such a decrease.

The anode catalyst layer 24 and cathode catalyst layer 28 are respectively formed on the anode and cathode substrates by coating onto one respective surface of each, a material prepared by applying a catalyst onto carbon powder to obtain a catalyst-carrying carbon powder, and kneading this resultant carbon powder with fluoropolymer resin, causing said material to be adhered under pressure to these surfaces by means of, for example, a roller; and then thermally treating the resultant substrates in an inert atmosphere at 320° to 350° C. for about 20 minutes.

The anode 25 and cathode 29 having the above-mentioned construction are disposed such that the catalyst layers 24 and 28 are allowed to oppose each other, and are adhered to each other with an electrolyte layer 26 interposed therebetween, and so a unit cell is obtained. The electrolyte layer is formed by impregnating an acidic electrolyte solution such as, concentrated phosphoric acid, concentrated sulfuric acid, or the like into a fine powder of an inorganic compound having high heat resistance, chemical resistance and oxidation resistance such as, silicon carbide, tantalum oxide, zirconia, or the like.

The above-described unit cells are stacked with an interconnector 31 interposed between each two adjacent cells and are adhered to each other for integration, thereby obtaining the electrochemical power generator of the present invention. The interconnector 31 consists of a high density carbon plate having a bulk density of 1.6 to 1.95 and a thickness of 2 to 3 mm and is formed on its one surface with a plurality of grooves 30 having a width of 1.2 to 2.5 mm and a depth of 1.3 to 2.5 mm, at pitches of 4 to 6 mm. This interconnector 31 is formed by blending graphite powder and phenolic resin and subjecting the blended mass to heat-forming under pressure. In the stacked body 40 obtained by stacking the unit cells with the interconnector 31 interposed therebetween, the surface of the interconnector 31 formed with the grooves 30 and the cathode 29 are adhered together, the grooves 30 constituting a flow passage for the oxidizing gas serving as the cathode-active material. On the other hand, the surface of the interconnector 31 not formed with the grooves 30 is adhered to the surface of the anode 25 formed with the grooves 21, said grooves 21 constituting a flow passage for the easily oxidizable gas, consisting mainly of hydrogen which serves as the anode-active material.

The reason for using a cathode having the catalyst dispersed into the interior thereof, is as follows. Generally, in an electrochemical power generator, air is most frequently used as the oxidizing gas serving as the cathode-active material. The oxygen content of air is only about 20%, however, and in addition, the cathode reaction rate of oxygen in the acidic electrolyte solution is very low. For these reasons, in order to obtain a cathode of high activity, the electrochemical power generator is constructed such that the catalyst is dispersed into the interior of the cathode substrate.

The range over which the catalyst is dispersed into the cathode substrate is preferably 30% of the thickness thereof. This is because, in the region of the cathode substrate extending from the surface of contact with the cathode catalyst layer up to a point corresponding to around 30% of the thickness of the cathode substrate, reaction of the oxidizing gas can be effected.

Dispersion of the catalyst into the cathode substrate can be effected not only by increasing the porosity of the cathode substrate, but also, when a vacuum is drawn from one surface of the cathode substrate and a catalyst dispersion is simultaneously applied to the other surface thereof, by intensifying the force of the vacuum-drawing operation, adding a surfactant into the catalyst dispersion, etc.

Meanwhile, the gas consisting mainly of hydrogen and serving as the anode-active material contains 60 to 80% hydrogen as well as carbon dioxide gas and steam. As is well known, hydrogen gas is four times as easy to diffuse as oxygen gas. Accordingly, even if the anode is higher in resistance to gas diffusion than the cathode, no serious effect is produced upon the performance of the anode substrate. For this reason, even if the anode is thick and has the grooves for gas passage whereby the electrolyte solution is impregnated into the ribs between the grooves, hydrogen is sufficiently diffused into the anode substrate, so that the anode reaction proceeds without hindrance. The same applies to the case where part of the ribs are made wide so as to cause a larger amount of electrolyte solution to be impregnated into the anode substrate.

Hereinunder, examples of experiments showing the excellent performance of the electrochemical power generator according to the present invention will be described.

Experiment 1

On one surface of a cathode substrate consisting of a porous graphite sheet having a thickness of 0.4 mm and a porosity of 70%, there was coated by drawing a vacuum from the other surface of said cathode substrate, a catalyst layer 0.15 mm thick which consisted of a platinum catalyst carried on carbon powder, thereby manufacturing a cathode A. A cathode B was similarly manufactured using a porous graphite sheet having a porosity of 60%.

The cathodes A and B were subjected to electrode reaction using air at 190° C. and under normal pressure, thereby obtaining a voltage-current density characteristic as shown in FIG. 3. In the graph of FIG. 3, the curve A represents the cathode A and the curve B the cathode B, illustrating the relation of the voltage to the current density in regard to both the cathodes. As seen in FIG. 3, the electrode reaction in cathode A is faster than that in cathode B.

Figure 4A:
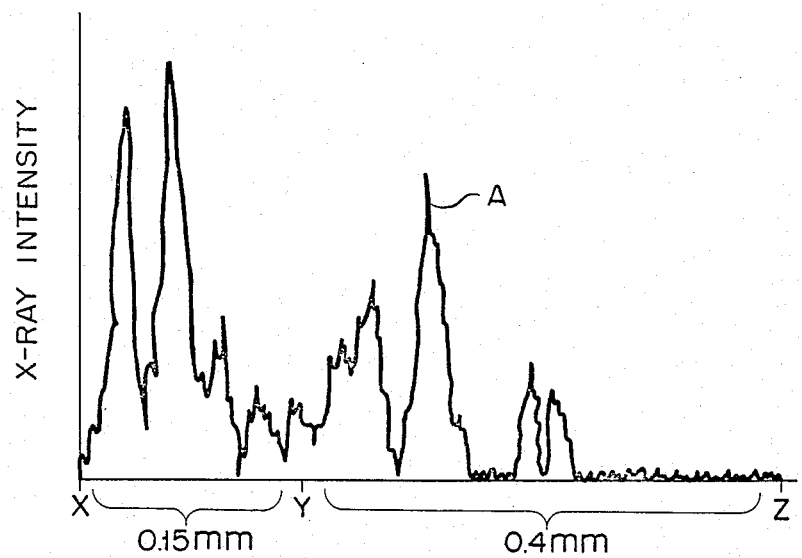
FIGS. 4A and 4B show the dispersion of a catalyst in the cathode of the power generator according to the invention and the dispersion of a catalyst in the cathode of the prior art power generator, respectively.
Figure 4B:
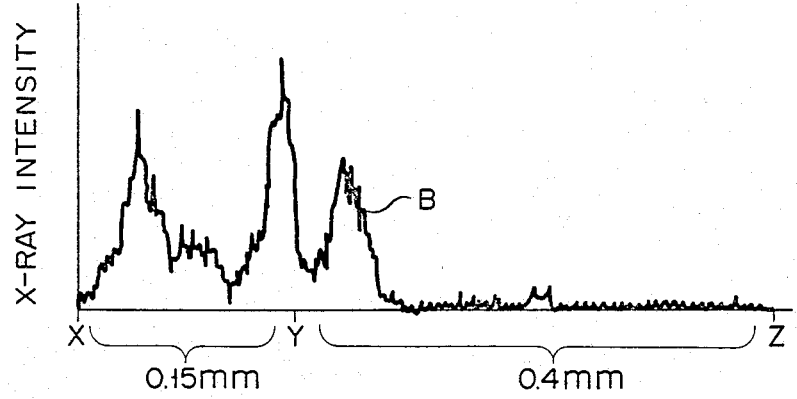

The reason for this is considered to lie in that the extent to which the catalyst is dispersed into the interior of the substrate of cathode A is greater than that to which the catalyst is dispersed into the interior of the substrate of cathode B. To provide this, the dispersion of platinum into the cathode substrate was examined in both cathodes A and B by means of an X-ray microanalyzer. The results shown in FIGS. 4A and 4B were obtained, respectively, with reference to the two cathodes A and B. In FIGS. 4A and 4B, a scale (X-Y) in the abscissa represents the thickness of the catalyst layer and a scale (Y-Z) represents the thickness of the cathode substrate, while the ordinate is plotted with the intensity of the X-ray indicating the amount of platinum dispersed in the cathode substrate.

As will be apparent from the comparison between FIG. 4A and FIG. 4B, the catalyst in cathode A is more deeply dispersed in the interior of the cathode substrate than the catalyst in cathode B.

Hereinunder, Examples 1 and 2 of the invention and Controls 1 and 2 are shown in the form of Experiment 2.

Experiment 2

EXAMPLE 1

As shown in FIG. 2, 20 unit cells each composed of an anode 25, cathode 29 and electrolyte layer 26 were stacked with the interconnectors 31 of 700 mm×700 mm interposed therebetween, and were adhered to each other for integration, thereby constructing an electrochemical power generator. This power generator has the following structure. The anode 25 is composed of the anode substrate 20 and the anode catalyst layer 24. The anode substrate 20 consists of a felt-like carbon fiber plate having a bulk density of 0.52 to 0.56 and a thickness of 2.5 mm and has on its one surface 167 grooves 21 for gas passage 1.5 mm in width and 2 mm in depth, at pitches of 3.5 mm. Of the ribs 2 mm in width formed between those grooves, one of every nine ribs is a wide rib having a width of 5.5 mm. A 10% dispersion of polytetrafluoroethylene was coated onto the bottom and side surfaces of the grooves 21 and the resultant grooves were dried and thus waterproofed. A platinum catalyst carried on carbon powder was coated onto the other surface of the anode substrate 20 and the resultant anode substrate was subjected to thermal treatment, whereby the anode catalyst layer 24 was formed. The amount of catalyst was 0.3 mg/cm².

The cathode 29 was prepared by coating a platinum catalyst carried on carbon powder onto one surface of the cathode substrate 27 consisting of a graphite sheet having a porosity of 70 to 75%, coating a 15% dispersion of polytetrafluoroethylene onto the other surface of the cathode substrate 27, and subjecting the resultant cathode substrate to drying and heat treatment. That is, the cathode substrate was waterproofed on one surface and was simultaneously formed with the cathode catalyst layer 28 on the other surface. The amount of catalyst was 0.6 mg/cm².

For the electrolyte layer 26, a paste layer obtained by kneading 40 weight % of silicon carbide powder having a particle size of several microns and 60 weight % of a 105% solution of phosphoric acid was used.

For the interconnector 31, a carbon plate of high density having a thickness of 2.5 mm and a bulk density of 1.85, prepared by blending graphite powder and phenolic resin and subjecting the resultant mass to thermoforming under pressure was used. The interconnector 31 has on its one surface 142 grooves 30 having a width of 2.5 mm and a depth of 1.8 mm, at pitches of 4.5 mm.

Measurement was made of the change over time, at a temperature of 200° C., of the internal resistance of the electrochemical power generator constructed as described above, the results being shown in Table 1 below.

Next, as the anode-active material, a gas mixture consisting of 75 mol % hydrogen, 15 mol % carbon dioxide and 10 mol % steam was used, and air was used as the cathode-active material. The above power generator was continuously operated at 200° C., under a gas pressure of 2.5 kg/cm² G and under a current density of 250 mA/cm² and measurement was made of the change over time of the terminal voltage, the results being shown in Table 2 below.

Further, in the power generator shown in this example, when the unit cells are stacked and adhered to one another, the connections among the unit cells were uniformly effected and no crushing or deformation whatsoever was caused to the gas passages, nor did any other mechanical inconveniences such as breakage or damage of the anode substrate or cathode substrate occur. Further, part of the electrolyte was stored in large amounts in the wide ribs on one surface of the anode; and, the contact between the gas and the electrolyte within the wide ribs was smaller in area than the contact between the gas and the electrolyte within the narrow ribs, with the result that the electrolyte was less likely to be entrained by the flow of the gas. For this reason, the amount of the electrolyte solution within the electrolyte layer was maintained constant for a long period of time and almost no deterioration of the performance of the power generator over time due to an ohmic loss in the electrolyte layer was noticed.

EXAMPLE 2

Figure 5:
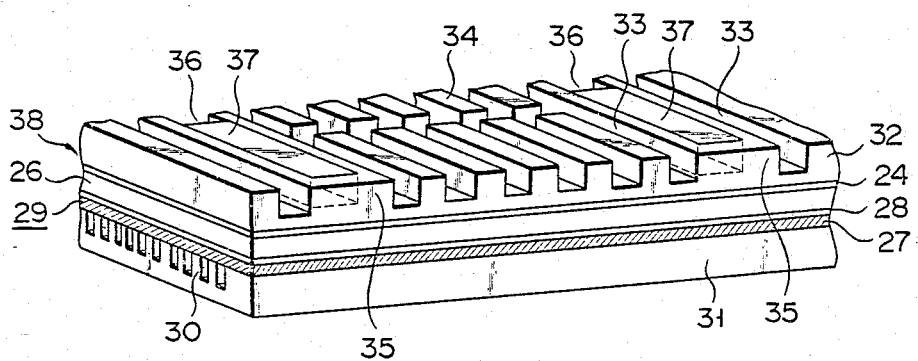
FIG. 5 is a perspective view showing a main part of the electrochemical power generator according to another embodiment of the invention.

An electrochemical power generator was constructed as in Example 1 except that the anode 38 was manufactured as shown in FIG. 5. The same parts and portions as in FIG. 2 substantially showing the power generator of Example 1 are denoted by the same notations as in FIG. 2 and a description thereof is omitted.

The anode 38 is composed of the anode substrate 32 and the anode catalyst layer 24. As for the anode substrate 32, a sintered porous plate was used having a bulk density of 0.48 to 0.56 and a thickness of 2 mm, obtained by kneading a chip-shaped graphite powder, pulp and polyvinyl alcohol and molding the resultant mass and thereafter sintering the resultant structure at 1,800° C. In one surface of the anode substrate, 138 grooves 33 1.8 mm in width and 1.6 mm in depth at pitches of 4 mm were formed. Of the ribs 2.2 mm in width formed between the grooves 33, one of every 6 ribs 2.2 mm in width is a wide rib 35 having a width of 6.2 mm. It should be noted here that the narrow ribs are formed with a plurality of connecting grooves 34 across the narrow ribs and at intervals of 20 cm. The wide ribs 35 are each formed with a groove 36 which is closed at both ends and which has a width of 2 mm and a depth of 1.5 mm. This groove 36 is filled with a paste 37 obtained by kneading a zirconium phosphate powder having a particle size of several microns and a 100% solution of phosphoric acid in a weight ratio of 1:2. That is, within the groove 36, the phosphoric acid constituting the electrolyte is received. The anode catalyst layer 24 is formed on the other surface of the anode substrate 32.

Measurement was made, under the same conditions as in Example 1, of the change over time of the internal resistance as well as of the terminal voltage of the electrochemical power generator equipped with the above-mentioned anode 38, the results being presented in Tables 1 and 2, respectively.

Control 1

An electrochemical power generator was constructed in which the anode substrate had no grooves, the cathode substrate had no catalyst dispersed thereinto, and the interconnector had no grooves in any surface thereof. Measurement was made, under the same conditions as in Example 1, of the change over time of the internal resistance as well as the terminal voltage of the power generator, the results being shown in Tables 1 and 2.

Control 2

An electrochemical power generator was constructed in which the anode substrate had only narrow ribs and the cathode substrate had no catalyst diffused thereinto and was similar to that shown in FIG. 1. Measurement was made, under the same conditions as in Example 1, of the change over time of the internal resistance and the terminal voltage of the power generator, the results being shown in Tables 1 and 2.

TABLE 1

| | Time (hours) | | | |
|---|---|---|---|---|
| | 100 ($\Omega/cm^2$) | 500 ($\Omega/cm^2$) | 1,000 ($\Omega/cm^2$) | 5,000 ($\Omega/cm^2$) |
| Example 1 | 0.09 | 0.09 | 0.10 | 0.10 |
| Example 2 | 0.08 | 0.08 | 0.08 | 0.09 |
| Control 1 | 0.13 | 0.18 | 0.24 | 0.35 |

TABLE 1-continued

| | Time (hours) | | | |
|---|---|---|---|---|
| | 100 (Ω/cm²) | 500 (Ω/cm²) | 1,000 (Ω/cm²) | 5,000 (Ω/cm²) |
| Control 2 | 0.13 | 0.12 | 0.15 | 0.20 |

As apparent from the above Table 1, the electrochemical power generator of this invention can maintain uniform internal resistance for a long period of time and also maintain a stable performance for a long period of time, as compared with the electrochemical power generator of the prior art.

TABLE 2

| Time (hours) | 100 | 500 | 1,000 | 5,000 |
|---|---|---|---|---|
| Example 1 | 0.70 (V) | 0.70 (V) | 0.69 (V) | 0.69 (V) |
| Example 2 | 0.69 | 0.69 | 0.68 | 0.69 |
| Control 1 | 0.58 | 0.60 | 0.52 | 0.35 |
| Control 2 | 0.65 | 0.64 | 0.62 | 0.60 |

As apparent from Table 2 above, the internal resistance of the electrochemical power generator of this invention is decreased to a lesser extent and the generator can operate stably for a long period of time as compared with the prior art electrochemical power generator.

What is claimed is:

1. An electrochemical power generator which is comprised of a plurality of unit cells stacked with interconnectors interposed therebetween, said unit cells each being comprised of an anode comprising a porous carbon plate having on its one surface a purality of grooves constituting gas passages and on its other surface an anode catalyst layer; a cathode comprising a plate having opposed first and second surfaces, and having on said first surface a cathode catalyst layer and applied on its said second surface the powder of hydrophobic material comprising a fluoropolymer resin; and an electrolyte layer interposed betweeen said anode and said cathode in such a manner that it is in contact, on opposite surfaces, with said anode catalyst layer and said cathode catalyst layer; said electrolyte being prepared by impregnating an acidic electrolyte into an inorganic compound powder exhibiting heat and chemical resistance; said interconnectors each consisting of a high density carbon plate and having, on one surface which is in contact with said cathode, a plurality of grooves constituting gas passages for a gas consisting essentially of hydrogen as an anode-active material and an oxidizing gas as a cathode-active material; said electric chemical power generator characterized in that first and second ribs, which said second ribs are wider than said first ribs, are formed between adjacent grooves of said anode substrate, said second ribs being present for every 5-10 of said first ribs; and wherein catalyst is dispersed in said cathode substrate over a range extending from the surface of said cathode substrate bearing said catalyst layer to a point within said cathode substrate.

2. The electrochemical power generator according to claim 1, wherein the width of said second ribs is 2 to 4 times the width of said first ribs.

3. The electrochemical power generator according to claim 1, wherein said first ribs are formed with connecting grooves thereacross in such a manner as to connect the grooves located on both sides of the first rib.

4. The electrochemical power generator according to claim 1, wherein said cathode substrate is dispersed with a catalyst, over a range extending from a surface of contact of said cathode substrate with said cathode catalyst layer, up to a point inside said cathode substrate which corresponds to 30% or more of the thickness of said cathode substrate.

5. The electrochemical power generator according to claim 1, wherein said first and second ribs are impregnated with an electrolyte solution.

6. An electrochemical power generator comprising a plurality of unit cells stacked with interconnectors interposed therebetween said unit cells each being comprised of an anode which comprises a porous carbon plate having opposed surfaces and bearing on one surface a plurality of grooves constituting gas passages and on its opposed surface an anode catalyst layer; a cathode defining two opposed surfaces and having on one said surface a cathode catalyst layer and on the surface opposed thereto a hydrophobic material powder comprising a fluoropolymer resin; and an electrolyte layer interposed between said anode and said cathode in such a fashion that it is in contact, at opposed surfaces, with said anode catalyst layer and said cathode catalyst layer, said electrolyte being prepared by impregnating an acidic electrolyte into an inorganic compound powder which exhibits heat and chemical resistance; said unit cells being further characterized by said interconnectors each comprising a high density carbon plate defining opposed surfaces and having, on said surface in contact with said cathode a plurality of grooves defining gas passages for an anode-active material consisting essentially of hydrogen and a cathode-active material consisting essentially of an oxidizing gas and wherein first and second ribs wider than said first ribs, are formed between adjacent grooves in said anode substrate, said second ribs each being formed with a groove closed at both ends, said groove being filled with a paste formed by impregnating an inorganic compound powder exhibiting heat and acid resistance with a concentrated acid solution; and wherein said cathode catalyst is dispersed in said cathode substrate over a range extending from said cathode catalyst surface to a point located inside said cathode substrate.

7. The electrochemical power generator according to claim 6, wherein the width of said second ribs is 2-4 times the width of said first ribs.

8. The electrochemical power generator according to claim 6, wherein said first ribs are formed with connecting grooves thereacross in such a manner as to connect the grooves located on both sides of said first ribs.

9. The electrochemical power generator of claim 6, wherein said cathode catalyst is dispersed in said cathode substrate over a range extending from said cathode catalyst surface up to a point inside said cathode substrate which corresponds to at least 30% of the thickness of said cathode substrate.

10. The electrochemical power generator of claim 6, wherein said first and second ribs are impregnated with an electrolyte solution.

* * * * *